May 6, 1924.

W. P. FRASER ET AL

FLEXIBLE DRIVING SHAFT

Filed March 7, 1922

Inventors:
W. P. Fraser
J. H. Young
By J. Wetter
Attorney

Patented May 6, 1924.

1,493,256

UNITED STATES PATENT OFFICE.

WILLIAM PETRIE FRASER AND JAMES HENRY YOUNG, OF LONDON, ENGLAND, ASSIGNORS TO THE COVENTRY CHAIN COMPANY, LIMITED, OF COVENTRY, WARWICK, ENGLAND.

FLEXIBLE DRIVING SHAFT.

Application filed March 7, 1922. Serial No. 541,831.

*To all whom it may concern:*

Be it known that we, WILLIAM PETRIE FRASER and JAMES HENRY YOUNG, subjects of the King of the British Dominions, residing at London, England, have invented certain new and useful Improvements in Flexible Driving Shafts, of which the following is a specification.

This invention consists in improvements in or relating to flexible shafts capable of transmitting motive power and torque, and has reference to that kind of shaft which consists essentially of a series of links and pivots in which the axes of alternate pivot joints are at right angles to one another.

In a known flexible shaft of this kind it has been proposed to form each link of a substantially hollow cylindrical body-portion formed with a loop extending across one of the open ends of the cylinder and two projecting lugs extending from the other end to embrace the looped portion of an adjacent link, and to be pivoted thereto. In forming such a shaft each link is stamped out of a strip of sheet metal, the two end portions of which are of large area as compared with the middle portion and are each bent into semi-cylindrical form and formed with lugs and recesses, whereby, when the strip is bent into U-shape form so that the edges of the semi-cylinders butt against one another, a projection on one abutting edge will engage a recess on the other such edge. It will be understood that in order to form the semi-cylindrical body-portions with means to inter-engage them at their meeting edges, the blank from which the link is formed must have a very considerable width relatively to the length of the link. There is considerable waste of material in stamping or cutting out such blanks to form the reduced middle portion and extremities and also unnecessary expense in the steps required in the manufacture of such links.

Our improvements have for their object to reduce the cost of production and waste of material in forming the links and these improvements will be more readily apparent from the following description which is that of preferred embodiments of the invention given by way of example, with the aid of the accompanying drawings, in which:—

Figure 3:
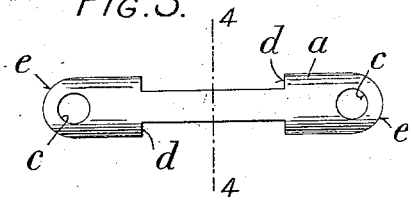
Fig. 3 is a plan.
Figure 4:
Figure 5:
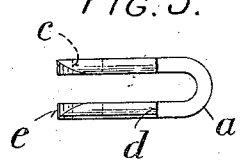
Figure 7:
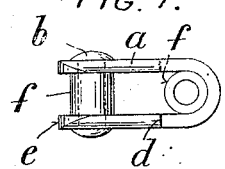
Figure 6:
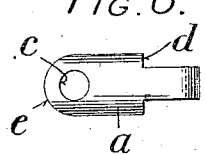
Figure 8:
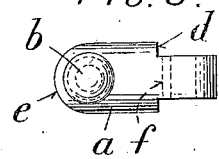

Fig. 4 a cross section of one of the links (along line 4—4 of Fig. 3) before it is bent to the shape of a horse-shoe, Fig. 5 is a side view and Fig. 6 a plan of the link after it has been bent up, Figs. 7 and 8 show a modification.

Like reference characters indicate like parts throughout the several figures of the drawings.

Figure 1:
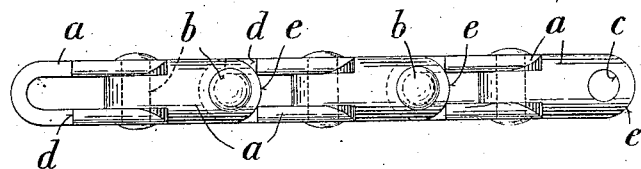
Fig. 1 is a plan.
Figure 2:
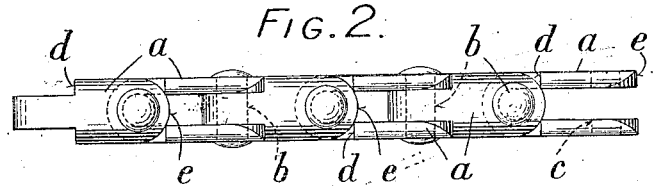
Fig. 2 is a side view of a portion of a chain or driving shaft embodying our invention and serving to explain the same.

Each link $a$, Figs. 1 and 2, is formed with rivet holes $c$, rounded ends $e$ and a reduced central portion in the region of the loop of the U as illustrated. The dimension of the central portion parallel with the axis of a pivot pin with which it is, or is to be engaged is such that when the links are assembled as illustrated, shoulders or abutments $d$ are provided with which the rounded ends of an adjacent link engage. The distance of the shoulders $d$ from the extremities of the link is so chosen that when the extremities of an adjacent link engage with the shoulders in the assembled shaft, back lash or end play at the pivotal connection may be, for all practical purposes, eliminated.

In forming the links each link, such as $a$, is conveniently stamped from a strip of sheet metal into the shape illustrated in Figures 3 and 4 and then bent up into the U-form. The links are then assembled end to end in their relation to one another as illustrated in Figures 1 and 2 and are connected together by inserting the pivot pins or rivets $b$ so that each pin or rivet passes through the pivot holes of one link and engages within the loop of an adjacent link. The pivot pins are finally secured in position by turning over their ends.

As shown more clearly in Fig. 4, a sheet metal strip, from which a link is formed, is not only rounded at the ends concentrically with the pivot holes $c$, but its outer surface is also rounded so as to taper towards the edges with a central longitudinal strip remaining flat. Thus a cross-section of the limbs of two links taken along the axis of the pivot pin will approximately comprise four circular segments lying in a circle with flats at the opposite ends of two diameters at right angles to one another. The heads of the rivets or pivot pins are rounded over on the flat portion of the link so that the outer surfaces of the heads lie substantially on that circle. This facilitates rotary motion and automatic adjustment of the links when they are enclosed in a flexible conduit.

The modification, shown in Figs. 7 and 8, and intended primarily for large chains, consists in mounting on each pivot pin or rivet a tubular distance piece or stay $f$ of a size suitable to pass through the bend or loop of the U of a link, and of such length as to lie between and engage adjacent faces of the limbs of the link.

Having now fully described our said invention and the manner in which it is to be performed, what we claim is:

1. A link of the character described adapted to be used in a flexible shaft which, if opened out flat, will be an approximately rectangular strip having parallel side edges, substantially semi-circularly curved ends with perforations therein concentric with the curvature of the ends, the curvature of the ends merging with the parallel sides, and a shallow recess midway in the length of each side edge substantially as described.

2. A link of the character described adapted to be used in a flexible shaft, which if opened out flat will be an approximately rectangular strip which has parallel side edges terminating in substantially semi-circularly curved ends with perforations therein concentric with the curvature of the ends, and a shallow recess midway in the length of each side edge to accommodate an end of an adjacent link and of a depth substantially equal to the thickness of the link end which it is to accommodate, substantially as described.

3. A link of the character described adapted to be used in a flexible shaft, formed from an approximately flat rectangular strip which has parallel side edges, substantially semi-circularly curved ends with perforations therein concentric with the curvature of the ends, and a shallow recess midway in the length of each side edge to accommodate an end of an adjacent link, the depth of the recess being substantially equal to the thickness of the link end which it is to accommodate, substantially as described.

4. A link of the character described adapted to form part of a flexible shaft, formed from an approximately rectangular strip which has parallel side edges ending in substantially semi-circularly curved ends with perforations therein concentric with the curvature of the ends, and a shallow recess midway in the length of each side edge, the depth of which recess is substantially equal to the thickness of the strip, substantially as described.

5. A link of the character described adapted to form part of a flexible shaft, formed from an approximately rectangular strip which has parallel side edges, substantially semi-circularly curved ends with perforations therein concentric with the curvature of the ends, and a shallow recess midway in the length of each side edge to accommodate an end of an adjacent link, the end walls of each recess being perpendicular to the side edge from which it extends, substantially as described.

6. A flexible shaft comprising a plurality of links each of which is formed from a strip bent into the form of a simple U, the curved loop of which merges smoothly into the side limbs thereof, each strip being reduced in depth in the region of the loop by the provision of shallow recesses extending inwardly from each side edge thereof and the ends of each link being semi-circularly curved and formed with perforations concentric with the curvature of the ends, substantially as described.

7. A flexible shaft comprising a plurality of links each of which is formed from an approximately rectangular strip bent into the form of a simple U, the curved loop of which merges smoothly into the side limbs thereof and each strip having parallel side edges, substantially semi-circularly curved ends with perforations in the ends concentric with the curvature thereof, and a shallow recess midway in the length of each side edge to accommodate an end of an adjacent link, the depth of the recess being substantially equal to the thickness of the link end which it is to accommodate, substantially as described.

8. A flexible shaft comprising a plurality of links each of which is formed from an approximately rectangular strip that in cross-section is flat on its inner face and curved on its outer face and is bent into the form of a simple U, the curved loop of which merges smoothly into the side limbs thereof and each strip having parallel side edges, substantially semi-circularly curved ends with perforations in the ends concentric with the curvature thereof, and a shallow recess midway in the length of each side edge to accommodate an end of an adjacent link, the depth of the recess being substantially equal to the thickness of the link end which it is to accommodate, substantially as described.

9. A flexible shaft comprising a plurality of links each of which is formed from an approximately rectangular strip bent into the form of a simple U, the curved loop of which merges smoothly into the side limbs thereof and each strip having parallel side edges, substantially semi-circular curved ends with perforations in the ends concentric with the curvature thereof, and a shallow recess midway in the length of each side edge to accommodate an end of an adjacent link the depth of the recess being substantially equal to the thickness of the link end which it is to accommodate, the dimensions of the parts being such that when the links are assembled with a pivot pin connecting the ends of each link and accommodated in the loop of an adjacent link, the rounded ends of each link will be held in engagement with the shoulders of an adjacent link afforded by the recesses formed in the side edges thereof, substantially as described.

10. In a flexible shaft of the character described, a link consisting of a strip, having semi-circular ends and centrally formed with oppositely arranged recesses on its longitudinal edges and bent upon itself centrally of the recessed portion, said recesses being of a depth approximately equal to the thickness of the strip; a pin connecting the ends of the link concentric with said semi-circular ends, the recesses having shoulders at the ends thereof and being of such length that when the link is connected with other links of its kind the semi-circular ends of the adjacent link will be held in abutment against the shoulders.

In testimony whereof we have hereunto set our hands.

WILLIAM PETRIE FRASER.
JAMES HENRY YOUNG.